United States Patent [19]

Thorell

[11] Patent Number: 4,953,377
[45] Date of Patent: Sep. 4, 1990

[54] METHOD AND APPARATUS FOR CUTTING AND DEBURRING TUBES

[75] Inventor: Lennart Thorell, Boxholm, Sweden
[73] Assignee: Boxholm Produktion AB, Boxholm, Sweden
[21] Appl. No.: 360,894
[22] PCT Filed: Dec. 18, 1987
[86] PCT No.: PCT/SE87/00616
§ 371 Date: May 30, 1989
§ 102(e) Date: May 30, 1989
[87] PCT Pub. No.: WO88/04589
PCT Pub. Date: Jun. 30, 1988

[30] Foreign Application Priority Data

Dec. 19, 1986 [SE] Sweden ............................ 86055027

[51] Int. Cl.$^5$ .............................................. B21D 19/02
[52] U.S. Cl. .......................................... 72/70; 82/46
[58] Field of Search ................... 409/140, 303; 82/46, 82/47, 173; 72/70, 72; 29/33 T

[56] References Cited

U.S. PATENT DOCUMENTS

| | | | |
|---|---|---|---|
| 3,196,651 | 7/1965 | Karrberg et al. ...................... | 72/70 |
| 3,563,119 | 2/1971 | Shashaty . | |
| 4,052,822 | 10/1977 | Obear .................................... | 82/47 |
| 4,467,508 | 8/1984 | Fjallstrom . | |

FOREIGN PATENT DOCUMENTS 2015795 10/1970 Fed. Rep. of Germany .
440876 8/1985 Sweden .

Primary Examiner—Lowell A. Larson
Attorney, Agent, or Firm—Nilles & Nilles

[57] ABSTRACT

A method and an apparatus for cutting and deburring tubes is disclosed wherein the cutting apparatus includes a cutting device, a double-acting deburring device and two sets of separately actuated carrier jaws for clamping a base tube which is to be cut therein. At least one of the sets of jaws is movable toward and away from the other set of jaws. The method is achieved by feeding a base tube into the pair of separately actuated carrier jaws. The jaws are then closed to clamp the base tube on either side of the cutting device. After the base tube has been cut, the cutoff part of the tube is moved away a predetermined distance to enable the double-acting deburring device to be introduced between the cut ends of the base tube and cutoff part. When the deburring device is in place between the ends, the movement of the cutoff part of the tube is then reversed, whereby it contacts the deburring device which in turn contacts the base tube. Simultaneous deburring of both cut ends takes place, the jaws are unclamped and a new cycle is commenced.

9 Claims, 3 Drawing Sheets

METHOD AND APPARATUS FOR CUTTING AND DEBURRING TUBES

BACKGROUND OF THE INVENTION

1. Field of the Invention

The present invention generally relates to a method and an apparatus for cutting and deburring tubes, and the invention is more particularly directed to such a method and such an apparatus in which a base tube is cut and deburred in a machine comprising two carrier jaws, a cutting means and a deburring means, whereby the cutting and the deburring of the base tube follow in a continuous operation, preferably without the need of removing the tube from the cutting and deburring machine during said workings.

2. Description of the Related Art

In previously known apparatus the cutting of the tube and the deburring of the cut tube ends generally have been made in two separate operations and in two separate machines. This necessitates some work with transportation and eventually an intermediate storing of the tubes, and with mounting of the cut off tube parts in a deburring machine after the base tube has been cut into tube pieces. It may also involve some problems to maintain predetermined tolerances.

SUMMARY OF THE INVENTION

The object of the invention therefore is to solve the problem of suggesting a method and an apparatus for cutting and deburring tubes and cut off tube pieces respectively in a continuous operation in a machine comprising a cutting means and a deburring means and two carrier jaws, at least one of which is movable in relation to the other, and in which the cutting and deburring according to the invention is made with the tube, or the cut off tube piece respectively, continuously clamped by the jaws.

In an embodiment of the invention the cutting and deburring is made according to the following cycle of operation:

a base tube is fed from an input side of the machine through a first jaw and as far as to a stop means of a second jaw;

the jaws are closed thereby clamp locking the tube;

a cutting means is folded down against the tube and cuts same at a predetermined position in relation to the two jaws;

the second jaw together with the cut off tube piece is displaced a predetermined distance axially apart from the first jaw;

the cutting means is withdrawn from the cutting position, and a double acting deburring means is moved into deburring position between the front end of the base tube and the rear end of the cut off tube piece;

the deburring means is activated at the same time as the second jaw, by a predetermined biasing force, is moved into contact with the deburring means which is thereby, in turn, moved into contact with the front end of the base tube, and the two tube ends are deburred concurrently;

the cut off and deburred tube piece is removed;

the jaws are unclamped and a new cycle of operation including cutting and deburring is started.

Further characteristics of the invention and advantages thereof will be evident from the following detailed specification in which reference will be made to the accompanying drawings.

BRIEF DESCRIPTION OF THE DRAWINGS

In the drawings FIG. 1 diagrammatically shows a machine for executing the method according to the invention.

DESCRIPTION OF THE PREFERRED EMBODIMENT

Figure 1:
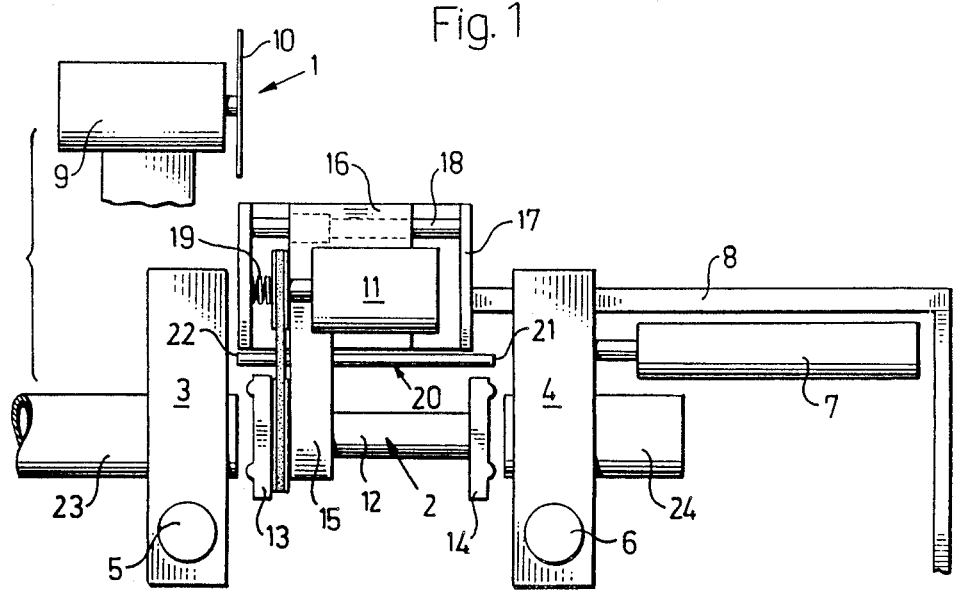

The machine diagrammatically shown in FIG. 1 generally comprises a cutting means 1, a deburring means 2 and two carrier jaws 3 and 4, at least one of which—in the illustrated case the right jaw 4—is movable in relation to the left jaw 3 and coaxially therewith. The two jaws are operated by means of servo motors 5 and 6 (just intimated), preferably hydraulic pistons, and likewise the right jaw 4 is operated for its axial displacement to and from the fixed jaw 3 by means of a servo motor like an air piston 7. The entire apparatus is mounted on a support 8.

The cutting means 1 comprises a motor 9 which drives a cutting blade or saw blade 10, preferably over a gear drive (not shown). The cutting means is rotatably mounted on the support 8 so as to be rotatable from an inactive position aside of the jaws and an active position in which the cutting blade is capable of cross cutting a tube which is held by the jaws. The cutting means is rotated by a motor actuated by a conventional actuation means.

The deburring means also includes a motor 11 which over a V-belt is connected to a deburring device having a rotatable shaft 12 and at each end thereof a deburring tool 13 and 14. Each deburring tool has a first cutting edge for external deburring and a second cutting edge for internal deburring of a tube end. The deburring means is mounted on an arm 15 belonging to a shelf 16 which is, in turn, reciprocatable on a fixed machine part 17 which is fixed mounted in relation to the support 8. Said fixed machine part 17 has a shaft 18 on which the shelf 16 with the motor 11 and the deburring means 12-16 are displacably mounted, for instance over a ball bearing or a similar means. A spring 19 tends to move the shelf with the deburring means in direction away from the fixed left jaw 3, as shown in the drawing, and the shelf with deburring means is freely movable in the direction towards said fixed jaw against the action of the spring 19. An indexing means 20 is mounted on the rotatable shelf, which indexing means has a length that is adapted considering the distance between the deburring tools 13 and 14, and which is intended to foresee that the deburring tools act on its respective tube end to an exactly intended degree. The indexing means is mounted so that the right end thereof forms a stop 21 for the movable right jaw 4, whereas the left end thereof forms a stop 22 for the shelf against the fixed left jaw 3.

The jaws 3 and 4 are of known type and comprises a pair of cooperating jaw halves, viz. a non-movable jaw half 3a, 4a and a movable jaw half 3b, 4b (see FIGS. 2-5) which are actuated by the hydraulic motors 5 and 6 respectively.

Figure 2:
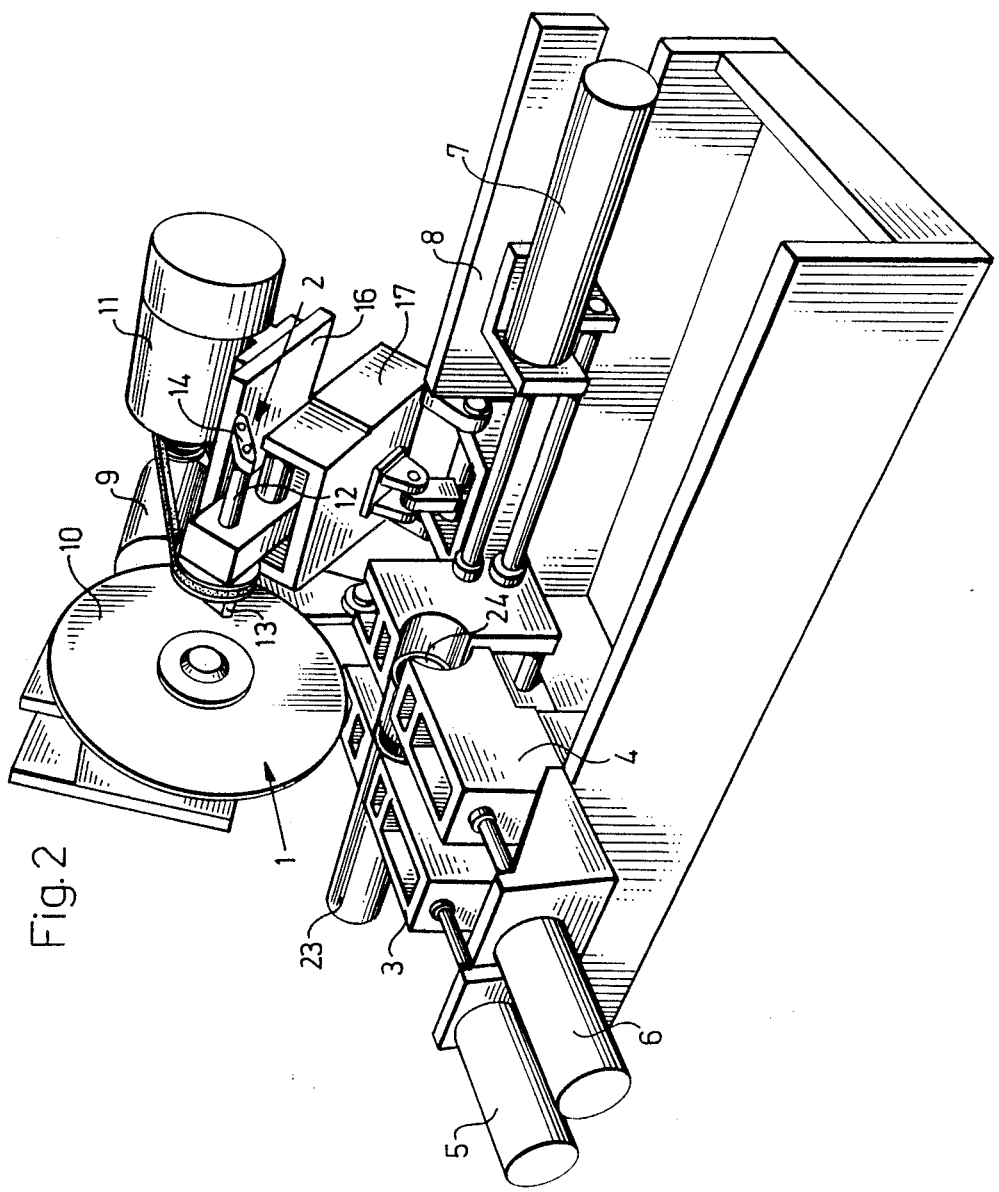
FIG. 2 is a perspective view of practical embodiment of a machine according to the invention.
Figure 4:
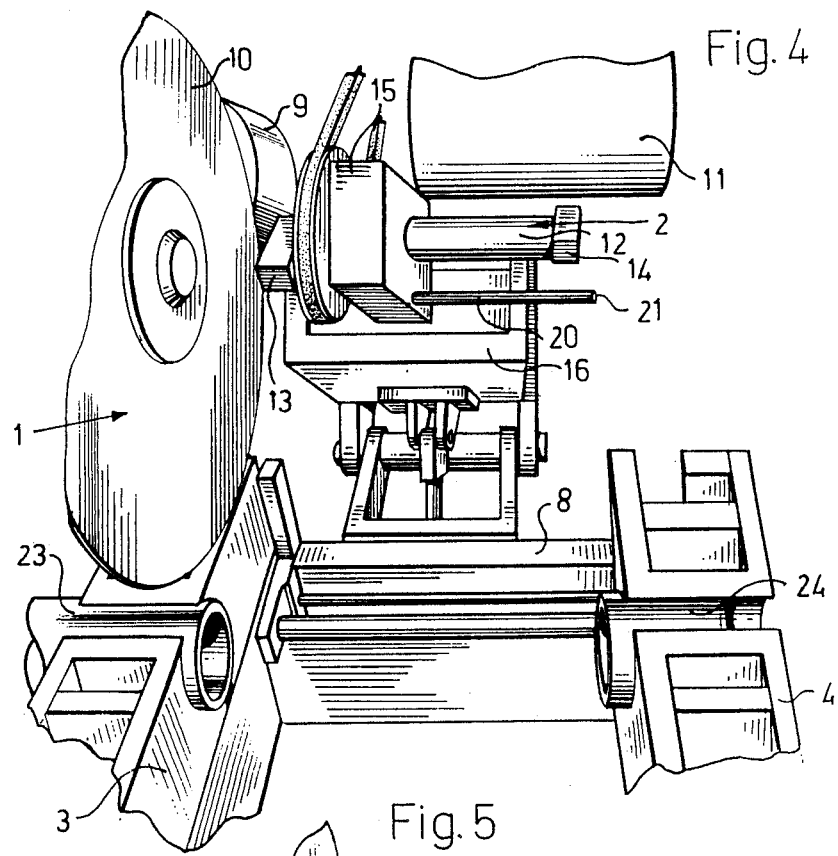

FIGS. 2-5 show different details of the function of the aparatus, and FIG. 2 shows the apparatus in the initial position (starting position) in which a base tube 23 has been introduced through the fixed jaw 3 and as far as to a stop (not shown) of the movable right jaw 4. Said stop is adjustable so that a tube piece 24 of exactly desired length can be cut off &he base tube 23. When the base tube thereby comes into contact with the stop of the movable jaw 4 the two hydraulic cylinders 5 and 6 are operated thereby clamping the tube to the jaws.

Figure 3:
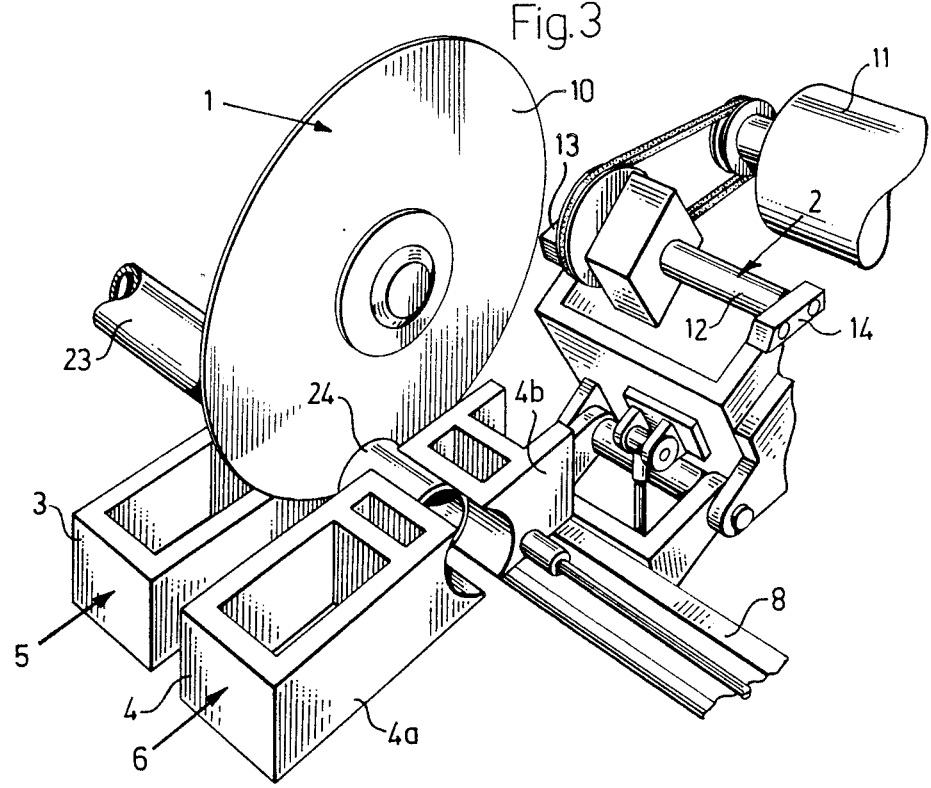
FIGS. 3, 4 and 5 illustrate, fragmentary, perspective views of the machine of FIG. 2 at three different steps of the method according to the invention.

In the next phase, which is illustrated in FIG. 3, the cutting means 1 is fold down so that the cutting blade or saw blade 10 comes into contact with the tube at the exactly intended place between the jaws 3 and 4, the motor 9 is started and the tube 23 is cut as indicated in the figure.

Figure 5:
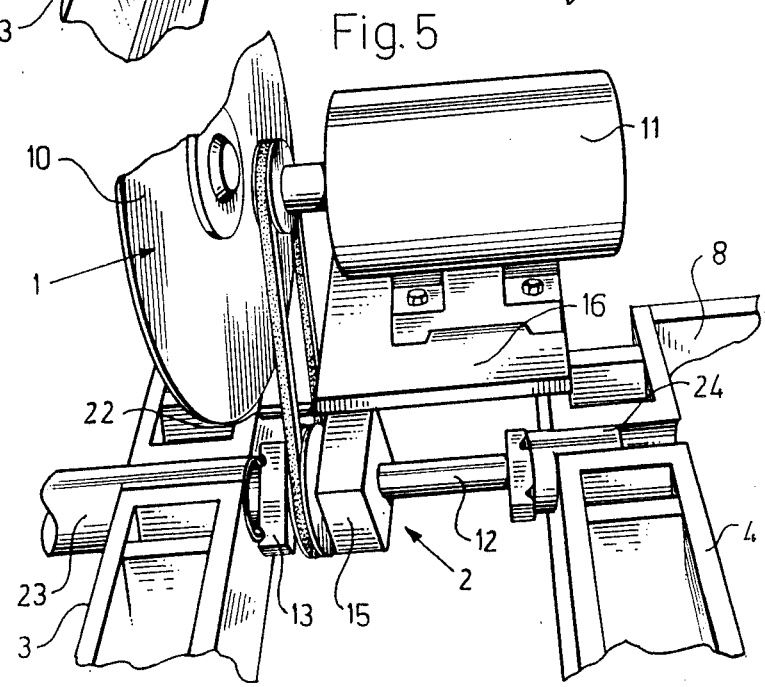

When the tube piece 24 has been cut off the base tube 23 the air cylinder 7 is actuated so that the movable jaw 4, together with the tube piece 24, which is still clamped by said jaw 4, is moved such long distance to the right (FIG. 4) that the deburring means 2 may be introduced in the space between the ends of base tube 23 and the cut off tube piece 24 (FIG. 5).

The motor of the deburring means is actuated so that the deburring tools 13 and 14 start rotating, and the air cylinder 7 is actuated, whereby the movable right jaw 4 is moved into contact with the stop 21 of the indexing means 20. By the actuation of the jaw 4 on the stop 21 and also by the actuation of the tube piece 24 on the deburring tool 14 the shelf 16 of the deburring means together with the motor and the deburring tools is moved to the left, so that the opposite stop 22 of the indexing means comes into contact with the fixed jaw 3, and so that the second deburring tool 13 comes into contact with the end of the base tube 23. Thereby the two ends of the base tube 23 and the cut off tube piece 24 facing each other are deburred concurrently. The extent and the depth of the deburring is defined by the indexing means and can be adjusted as desired. Different types of deburring or other treatment of the tube ends can, if desired, be made at the front and the rear ends respectively of the tube parts.

After the above described cutting and the directly following deburring operation is completed the deburring means is folded back to its withdrawn position, the cut and deburred tube piece 24 is removed, the movable jaw 4 is returned to its initial position shown in FIG. 2, and a new cutting and deburring cycle starts.

In order to have also the front end of a new base tube 23 deburred it is possible to deburr same by clean-cutting the end of the tube and subsequently deburring said end, without getting thereby an actual cut off tube piece, or the deburring of the first cut off tube piece can be made as conventional. Any subsequently cut off tube pieces are deburred automatically both at the front end and at the rear end.

As known per se the entire apparatus including the cutting means and the deburring means are connected to an automatically operating control means, from which indications and starting/stopping signals are obtained when the base tube 23 is introduced to a desired extent in the movable jaw 4, that is in relation to the fixed jaw 3; when the cutting is to be started; when the cutting is ended and the cutting means is to be withdrawn; when the deburring is to be started; when the air cylinder for the movable jaw is to be actuated; when the deburring means is to be withdrawn; when the cut off tube piece is to be removed, etc., so that the machine operates automatically.

By means of the method and the apparatus it is possible to cut and deburr also very short tube pieces and materials which are difficult to deburr, like copper. By the invention it is also possible to produce tube pieces with great accuracy and having very small differences in manufacturing tolerances.

It should be observed that the deburring means can be substituted by any other means for working of the front end of the cut off tube piece 24, for instance grinding of a tapering input end or a similar shape, and that the invention is not restricted only to deburr working.

It is also obvious to the expert that the illustrated and described apparatus is only an exemplifying embodiment which dues not restrict the invention, and that many different modifications and variations may be presented within the scope of the appended claims.

I claim:

1. A method for cutting a stationary nonrotating base tube (23) successively into several smaller tube pieces (24) with adjacent cut ends between pieces being directly subjected to a subsequent metal working such a deburring in a machine that includes an input end, a cutting means (1), an actuable double acting movable metal working means (2), fixed and movable carrier jaws (3, 4), each having an opening through which said base tube can pass and be releasably clamped, said movable jaw (4) being axially movable along said base tube in relation to said fixed jaw (3) and having a tube stop, comprising the following steps:

A. moving said movable jaw to an initial position in spaced adjacent relation to said fixed jaw;
   B. introducing said base tube (23) from the input end of the machine through fixed jaw (3) and into contact with said stop of said movable jaw (4);
   C. closing said jaws (3, 4) to clamp and hold said base tube in said stationary nonrotating position;
   D. moving said cutting means (1) down to a cutting position in said space (23) between said fixed and movable jaws (3, 4) and cutting said base tube at a predetermined position in relation to the fixed and movable jaws to create a front end on said base tube and a cutoff tube piece (24) having a rear end adjacent said front end of said base tube;
   E. moving only said movable jaw (4) together with said cutoff tube piece (24) still clamped therein, axially a predetermined distance away from said fixed jaw (3) to create a work space and maintaining said base tube (23) and said cutoff tube piece (24) in coaxial relation with respect to each other while moving said cutting means (1) out of said cutting position;
   F. moving said double acting metal working means (2) into said work space between said front end of said base tube (23) and said rear end of said cutoff tube piece (24);
   G. actuating said metal working means (2) and at the same time moving only said movable jaw (4) axially to place said rear end of the cutoff tube piece into contact with said metal working means (2), and continuing axial movement of only said movable jaw while said tube piece rear end is in contact with said metal working means to force said metal working means to move axially into contact with said front end of said base tube (23) to cause both of said front and rear tube ends to be concurrently worked by the metal working means;

H. removing said metal working means from said work space; and

I. unclamping said fixed and movable jaws (3, 4, removing said cutoff tube piece (24), and returning said movable jaw to said initial position for commencement of a new cycle of operation.

2. The method according to claim 1, wherein said metal working means has spaced apart first and second fixed stops and wherein said movable jaw (4), during said metal working in step G is moved into contact with said first fixed stop (21), and wherein said metal working means (2) is then, via said second fixed stop (22), moved into contact with said fixed jaw (3) so as to restrict the extent of the metal working on said front and rear ends.

3. The method according to claim 1, wherein in step F said metal working means (2) is in a now actuated condition when moved into said work space and is kept resiliently biased (19) to a position separated from said front end of said base tube (23) clamped in said fixed jaw (3).

4. The method according to claim 1, wherein the cutting and the metal working means are alternately operated by the actuation of motors for rotating and driving (9) the cutting means, rotating and driving (11) the deburring means, the actuation (5, 6) of the two carrier jaws (3, 4) and the displacement (7) of the movable carrier jaw (4).

5. In an apparatus for executing the method according to any of the preceding claims which includes a support (8); a cutting means (1), a selectively actuated double acting metal working means having two opposite working tools (13, 14), two spaced apart carrier jaws (3, 4) mounted on said support having means for clamping and holding, in operation, a base tube and an adjacent tube piece that is cut off from the base tube, a cutting means (1) and a metal working means (2) mounted on said support (8) so that they can be alternately brought from a removed position into a working position intermediate said two jaws (3, 4), and which when in use will alternately provide for cutting of a base tube which is clamped by said two jaws (21, 22) and a metal working of the resulting two cutoff ends on the base tube (23) and on the adjacent tube piece (24) cut off therefrom, the improvement comprising: means for mounting one of said carrier jaws (3) in a fixed position on said support (8); means for mounting the other of said jaws (4) on said support for axial movement toward and away from said fixed jaw; means for mounting said metal working means (2) on said support for axial movement in response to movement of said movable jaw (4); and a biasing means (19) on said support for keeping said metal working means, when unactuated, in a position spaced form the cutoff end of the base tube (23).

6. The apparatus according to claim 5, wherein said metal working biasing means (2) comprises a spring (19) for keeping said metal working means, when unactuated, spaced from the cut end of the base tube (23).

7. The apparatus according to claim 6, wherein said metal working means includes a carrier (15) mounted on said support for movement axially of said base tube; wherein said carrier (15) has an indexing means (20) providing a first stop (21) for limiting movement of said moveable jaw (4) towards the metal working means (2), and a second stop (2) for limiting the axial movement of metal working means (2) towards the other jaw (3).

8. Apparatus according to claim 5, wherein said first carrier jaw (3) is fixed against movement in the direction axially of a tube clamped therein, and that the second jaw (4) is movable in a direction axially of a tube clamped therein, and wherein said second jaw is movable by an air cylinder (7).

9. Apparatus according to claim 5, wherein said second movable carrier jaw (4) has, relative to the direction in which the base tube (23) is introduced into the apparatus, a stop means determining an initial position adjacent the first jaw (3) for making it possible to introduce the base tube (23) an exactly predetermined distance in said two jaws (3, 4).

* * * * *